(12) United States Patent
Kiyama et al.

(10) Patent No.: US 8,936,861 B2
(45) Date of Patent: Jan. 20, 2015

(54) SEALED BATTERY

(75) Inventors: Akira Kiyama, Toyota (JP); Tadayoshi Yamada, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 437 days.

(21) Appl. No.: 13/126,773

(22) PCT Filed: Nov. 4, 2009

(86) PCT No.: PCT/JP2009/068848
§ 371 (c)(1),
(2), (4) Date: Apr. 29, 2011

(87) PCT Pub. No.: WO2010/053100
PCT Pub. Date: May 14, 2010

(65) Prior Publication Data
US 2011/0206958 A1   Aug. 25, 2011

(30) Foreign Application Priority Data

Nov. 6, 2008 (JP) ................. 2008-285086

(51) Int. Cl.
*H01M 2/34* (2006.01)
*H01M 2/12* (2006.01)

(52) U.S. Cl.
USPC ............. 429/56; 429/53; 429/54; 429/55; 429/57; 429/61

(58) Field of Classification Search
None
See application file for complete search history.

(56) References Cited

U.S. PATENT DOCUMENTS

| | | |
|---|---|---|
| 4,855,195 A | 8/1989 | Georgopoulos et al. |
| 5,188,909 A | 2/1993 | Pedicini |
| 5,418,084 A | 5/1995 | Georgopoulos |
| 6,376,120 B1 * | 4/2002 | Azema ........................... 429/61 |
| 6,866,962 B2 * | 3/2005 | Bechtold et al. ............... 429/94 |
| 2005/0084752 A1 | 4/2005 | Kim |

(Continued)

FOREIGN PATENT DOCUMENTS

| | | |
|---|---|---|
| CN | 1612373 | 5/2005 |
| EP | 1 357 615 A1 | 10/2003 |

(Continued)

OTHER PUBLICATIONS

U.S. Appl. No. 12/331,843, filed Dec. 2008, Yamashita et al.*

(Continued)

*Primary Examiner* — Patrick Ryan
*Assistant Examiner* — Christopher Domone
(74) *Attorney, Agent, or Firm* — Finnegan, Henderson, Farabow, Garrett & Dunner, LLP

(57) ABSTRACT

A sealed battery (10) provided by the present invention includes: a current cut-off valve (22); and a connecting member (30) having an engagement hole (34) formed in a location adjacent to the current cut-off valve. The current cut-off valve is conductively connected to the connecting member by joining linearly to a peripheral edge of the engagement hole and/or joining at a surface that is in contact with an inner wall of the engagement hole in a state in which part of the current cut-off valve is fitted into the engagement hole. When an internal pressure of a battery case (40) rises above a predetermined level, the current cut-off valve is deformed outward of the case by the internal pressure, the current cut-off valve is separated from the connecting member, and the electric connection between the connecting member and the current cut-off valve is broken.

9 Claims, 3 Drawing Sheets

(56) References Cited

U.S. PATENT DOCUMENTS

| | | |
|---|---|---|
| 2005/0244706 A1 | 11/2005 | Wu et al. |
| 2006/0275657 A1 | 12/2006 | Kozuki et al. |
| 2009/0148767 A1 | 6/2009 | Yamashita et al. |

FOREIGN PATENT DOCUMENTS

| | | |
|---|---|---|
| JP | 8-115714 | 5/1996 |
| JP | 10-241653 | 9/1998 |
| JP | 11-86822 | 3/1999 |
| JP | 2003-308825 | 10/2003 |
| JP | 2005-108503 | 4/2005 |
| JP | 2006-351512 | 12/2006 |
| JP | 2007-227283 | 9/2007 |
| JP | 2009-140870 | 6/2009 |
| WO | WO 2007/139879 A2 | 12/2007 |

OTHER PUBLICATIONS

International Search Report in International Application No. PCT/JP2009/068848; Mailing Date: Feb. 16, 2010.

* cited by examiner

SEALED BATTERY

TECHNICAL FIELD

The present invention relates to a sealed battery, and more particularly to a sealed battery provided with a current cut-off mechanism that cuts off the electric current at the time of abnormality.

The present application is a national phase application of International Application No. PCT/JP2009/068848, filed Nov. 4, 2009, and claims priority to Japanese Patent Application No. 2008-285086 filed on Nov. 6, 2008, the contents of both of which are hereby incorporated by reference into the present application.

BACKGROUND ART

Secondary batteries (storage batteries) such as lithium ion batteries and nickel hydride batteries have recently gained importance as power sources for installation on vehicles or power sources for personal computers and portable terminals. In particular, lightweight lithium ion batteries that make it possible to obtain a high energy density are expected to be advantageously used as high-power power sources for installation on vehicles. Examples of typical structures of such secondary batteries include batteries of sealed structure (sealed batteries) in which a case accommodating an electrode body and an electrolytic solution is sealed.

However, when a defective battery is present or an erroneous operation is performed due to failure of a charging device when the batteries of such kind are charged, an unusually high current can flow in the battery and the battery can be overcharged. When battery abnormality such as overcharging occurs, gas is generated inside the sealed battery case, the internal pressure in the case rises, and the battery bulges under the effect of such abnormal internal pressure (gas pressure). Under certain circumstances, the case can be ruptured. As the conventional measure against such abnormality, a battery structure has been suggested that is provided with a current cut-off valve that cuts off the electric current and releases the internal pressure when the internal pressure in the sealed battery case rises abnormally.

For example, Patent Documents 1 and 2 listed below disclose sealed batteries including a current cut-off valve connected to a linking portion (connecting member) of an electrode body by a rupturable metal foil that is ruptured under the effect of abnormal internal pressure, and when an abnormal pressure acts upon the current cut-off valve, the rupturable metallic foil is broken, the current cut-off valve is separated from the linking portion (connecting member) and the electric current is cut off. Patent Document 3 describes a structural example of a current cut-off valve representing the related art.

Patent Document 1: Japanese Patent Application Laid-Open No. H10-241653.
Patent Document 2: Japanese Patent Application Laid-Open No. 2007-227283.
Patent Document 3: Japanese Patent Application Laid-Open No. H8-115714.

SUMMARY OF THE INVENTION

However, in the sealed battery including a current cut-off valve of the configuration such as disclosed in Patent Documents 1 and 2, the aforementioned metal foil through which current is conducted from the electrode body to the external terminal (or in the opposite direction) can itself be a factor increasing the internal resistance of the battery. Such increase in internal resistance is especially undesirable in batteries for vehicles that are discharged by a large current.

The present invention has been created with the foregoing in view and it is a main object of the invention to provide a sealed battery including a current cut-off mechanism that can reliably cut off the current in the abnormal state and has a structure that makes it possible to discharge a comparatively large current, while preventing the increase (rise) in internal resistance in the normal state.

The battery provided by the present invention is a sealed battery including: an electrode body including a positive electrode and a negative electrode; a case accommodating the electrode body; a current cut-off valve that prevents gas circulation between an inside and an outside of the case and is deformed when an internal pressure in the case rises above a predetermined level (when the internal pressure rises abnormally), and either a positive external terminal or a negative external terminal electrically connected to the electrode body via the current cut-off valve.

In the battery according to one aspect disclosed herein, a connecting member is provided that is electrically connected to the electrode body and has an engagement hole formed in a location adjacent to the current cut-off valve, and the current cut-off valve is conductively connected to the connecting member by joining linearly to a peripheral edge of the engagement hole in a state in which part of the current cut-off valve is fitted into the engagement hole. In the battery according to another aspect of the invention disclosed herein, a connecting member is provided that is electrically connected to the electrode body and has an engagement hole formed in a location adjacent to the current cut-off valve, and the current cut-off valve is conductively connected to the connecting member by joining at a surface that is in contact with an inner wall of the engagement hole in a state in which part of the current cut-off valve is fitted into the engagement hole.

In the battery disclosed herein when the internal pressure in the case rises above the predetermined level (when the internal pressure rises abnormally), for whatever reason, the current cut-off valve is deformed outward of the case by the internal pressure and the current cut-off valve is separated from the connecting member, thereby breaking the electric connection between the connecting member and the current cut-off valve.

In the sealed battery including the current cut-off valve (current cut-off mechanism) in accordance with the present invention, the current cut-off valve is joined to the connecting member (typically, a conductive member disposed between the current cut-off valve and the electrode body) by linearly (typically, annularly) joining at the peripheral edge of the engagement hole (typically, a through hole through which the connecting member passes). Further, it is preferred that the current cut-off valve be joined at the surface that is in contact with the engagement hole and joined and electrically connected to the connecting member.

By joining the current cut-off valve and the connecting member linearly or at the surface by using the peripheral edge portion (and/or inner wall portion of the engagement hole) of the engagement hole, it is possible to realize direct electric connection of the current cut-off valve and the connecting member, without introducing another member such as a metal foil that causes the aforementioned increase in internal resistance. Further, since linear joining (that is, a joint structure using the peripheral edge of the hole and extending annularly) and/or surface joining (that is, a joint structure that uses the inner wall surface of the engagement hole and expands as a surface) is performed, it is possible to ensure a contact surface area, that is, conduction surface area, that is larger than that in the case of spot-like joining of the current cut-off valve and the metal foil by the conventional spot welding or the like.

Therefore, in accordance with the present invention, it is possible to provide a sealed battery having a current cut-off mechanism that is suitable for conduction of a comparatively large current, without increasing the internal resistance. Therefore, the battery disclosed herein is advantageous as a secondary battery for a vehicle that is installed as a power source on an electric automobile or a hybrid automobile.

In one preferred embodiment of the battery disclosed herein, the connecting member is ruptured, following the deformation of the current cut-off valve, on an outer periphery of the joining portion, and part of the connecting member including the peripheral edge of the engagement hole is separated together with the current cut-off valve from a main body of the connecting member.

In the sealed battery of such a configuration, part of the connecting member is ruptured when the current cut-off valve is deformed following the increase in internal pressure of the battery case, thereby making it possible to cut off the current reliably. Further, in the battery according to this embodiment, the rupturable portion is formed in a portion different from the joining portion of the current cut-off valve and the connecting member. Therefore, the current cut-off valve and the connecting member can be strongly joined (that is, with a joining strength such that they cannot be easily separated by the increase in internal pressure). As a result, electric conductivity of the joining portion in the normal state can be maintained at a high level. Therefore, the sealed battery of such a mode is advantageous as a sealed battery equipped with a current cut-off mechanism that is suitable for conducting a comparatively large current.

It is further preferred that the portion of the connecting member that is separated together with the current cut-off valve be formed thinner than the main body of the connecting member. Where such thin portion is formed, the rupture of the portion during abnormal increase in internal pressure is facilitated and the current can be cut off more reliably (rapidly).

Alternatively, and more preferably, a slit that can facilitate the rupture is formed in advance in the portion of the connecting member that is ruptured. Where such slit is formed, the rupture of the portion during abnormal increase in internal pressure is also facilitated and the current can be cut off more reliably (rapidly). It is especially preferred that the slit be provided in the abovementioned thin portion.

In another preferred embodiment of the battery disclosed herein, when the internal pressure of the case further rises (when the internal pressure further rises after the current has been cut off), part of the current cut-off valve that has separated from the connecting member ruptures and gas release from the inside to the outside of the case is realized.

In the sealed battery of such a configuration, when the current cut-off valve is actuated (deformed), the current is cut off in the above-described manner, and the internal pressure further increases, part of the current cut-off valve ruptures, air tightness of the case interior is canceled, and gas can flow from and into the case. Therefore, when the internal pressure of the case increases, for whatever reason, gas generated inside the case can be reliably released after the current has been cut off. Therefore, rupture of the battery and adverse effect on environment can be reliably prevented.

It is preferred that a slit that can facilitate the rupture be formed in advance in the portion of the current cut-off valve that is ruptured. Where such slit is formed, the rupture of the portion is facilitated and the gas can be released more reliably (rapidly).

In a preferred embodiment, the sealed battery disclosed herein is a cylindrical sealed battery in which the case is formed in a cylindrical shape. It is further preferred that the connecting member and the current cut-off valve be formed in respective disk shapes and provided at one end in a longitudinal direction of the cylindrical case. Here, the engagement hole is formed in a central portion of the disk-shaped connecting member, the peripheral edge portion of the engagement hole is formed thinner than other portions, and the disk-shaped current cut-off valve is disposed in a state in which a central portion of the disk-shaped current cut-off valve is fitted into the engagement hole in the central portion of the connecting member.

In the cylindrical battery of such an embodiment, the central portion of the disk-shaped current cut-off valve is fitted into the engagement hole provided in the central portion of the disk-shaped connecting member (typically, a conductive member linked to the electrode body located inside the case of the lead member from the electrode body), and the peripheral edge of the engagement hole and the circumference of the fitted portion of the current cut-off valve are linearly (annularly) joined. Alternatively, the inner wall of the engagement portion and the portion of the fitted portion of the current cut-off valve that is in contact with the inner wall are joined over a surface (an annularly expanding surface of the inner wall of the engagement hole). Therefore, it is possible to provide a sealed battery having a current cut-off mechanism that is suitable for conduction of a comparatively large current, without increasing the internal resistance.

In such a cylindrical sealed battery, it is further preferred that either the positive external terminal or the negative external terminal that is electrically connected to the current cut-off valve constitute a lid covering one end in the longitudinal direction of the cylindrical case. Further, the external terminal in the form of the lid and the connecting member are mounted on one end in the longitudinal direction of the cylindrical case, while being adjacent to each other. Where the lid is the external terminal, it is possible to form a joined structure (that is, current cut-off mechanism) of the current cut-off valve and the connecting member inside the lid and case body. Therefore, it is possible to provide a cylindrical battery including the current cut-off valve or other current cut-off mechanism in a compact form.

BEST MODE FOR CARRYING OUT THE INVENTION

A preferred embodiment of the present invention will be described below with reference to the appended drawings. A matter necessary for implementing the invention (for example, a joining method such as welding, configurations of the electrode body and electrolytic solution constituting the battery, processes for constructing the battery) that are not the matter particularly referred to in the present description (for example, a joint structure of the connecting member and current cut-off valve) can be construed as a design matter to be selected as appropriate by a person skilled in the art on the basis of the conventional techniques and configurations in the related field. The present invention can be implemented on the basis of the contents disclosed in the present description and the common technical knowledge in the related field.

The sealed battery provided by the present invention includes the current cut-off valve and the connecting member joined by the aforementioned joint structure and is not restricted by other constituent elements that are not specific features of the present invention.

The present invention can be applied to batteries of various types. For example, the present invention can be advantageously applied to batteries of a comparatively high capacity that are charged and discharged at a high current, for example, secondary batteries such as lithium ion batteries, nickel hydride batteries, nickel-cadmium batteries, lead batteries, and nickel-zinc batteries. The present invention can be also advantageously applied to electric double-layer capacitors. Therefore, in relation to the present invention, the term "battery" includes the so-called chemical batteries such as lithium ion batteries and nickel hydride batteries, and also power accumulating elements (physical batteries) that can be used similarly to the chemical batteries (for example, lithium ion batteries) in a similar field like electric double-layer capacitors.

A cylindrical lithium ion battery 10 will be described in detail below, with reference to the appended drawings, as a sealed battery in accordance with the present invention.

Figure 1A:
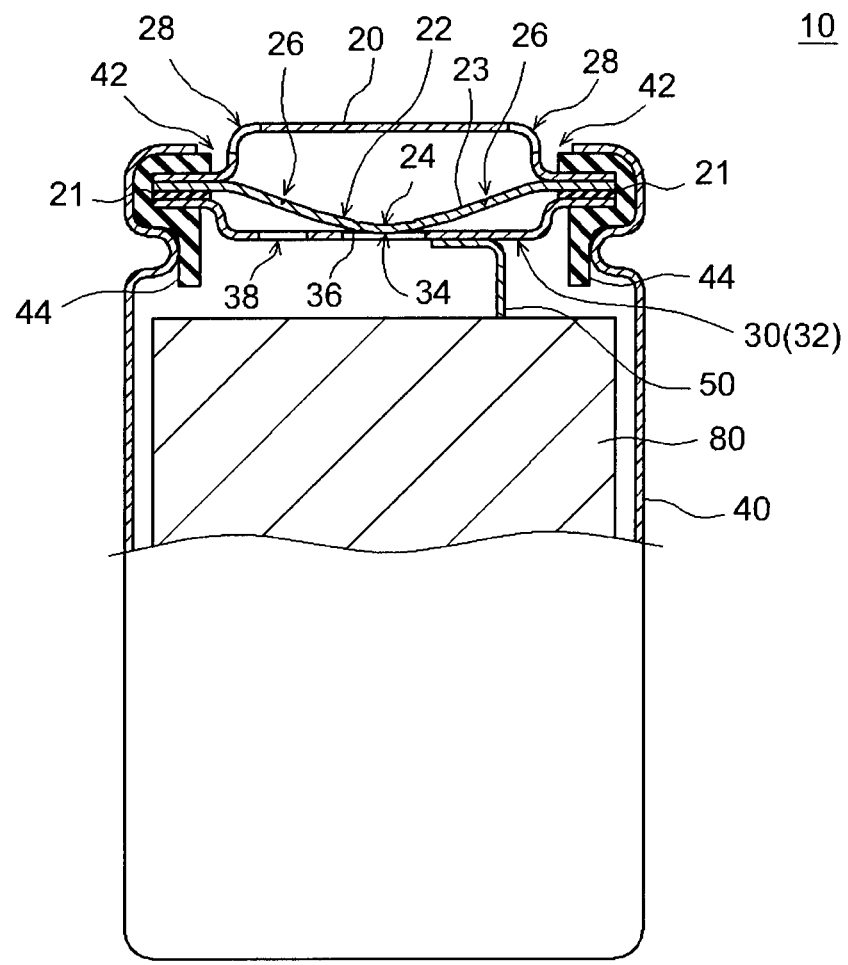
FIG. 1A is a side view illustrating by a partial cross section a configuration of the battery according to one embodiment in a normal state of the internal pressure of the case.
Figure 1B:
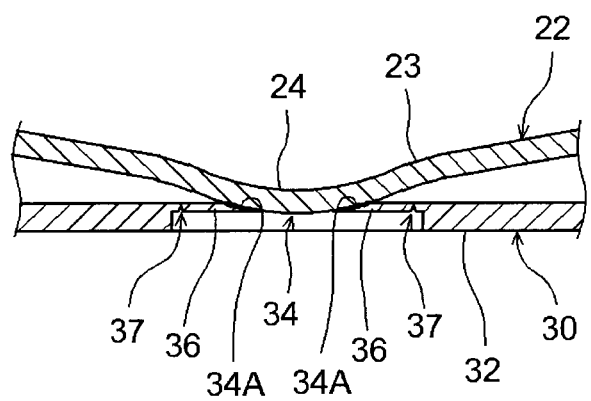
FIG. 1B is a partial cross-sectional view illustrating the principal portion of the battery shown in FIG. 1A.

FIG. 1A is a cross sectional view (partially a side view illustrating the external appearance) illustrating the configuration of the cylindrical sealed battery 10 (referred to hereinbelow simply as "battery") according to the present embodiment in the normal state of the battery. FIG. 1B is a partial cross-sectional view illustrating the principal portion (that is, a current cut-off valve 22, the central portion of the connecting member, and a periphery thereof) of the battery 10 in the normal state.

As shown in FIG. 1A, similarly to the conventional cylindrical battery, the battery 10 according to the present embodiment typically includes an electrode body 80 including predetermined materials constituting the battery (active materials of positive and negative electrodes, collectors of positive and negative electrodes, a separator, and the like), a battery case 40 accommodating the electrode body 80 and the appropriate electrolytic solution, and a lid 20 that closes an opening 42 of the case 40.

The battery case 40 may be of any shape, provided that the below-described wound electrode body 80 can be accommodated therein. In the present embodiment, the battery case has an open-end cylindrical shape having the opening 42 formed at the upper end thereof. The material of the case 40 is not particularly limited and may be similar to that used in the conventional batteries. In the present embodiment, the case is formed from a steel sheet plated with nickel. Further, the case 40 according to the present embodiment is connected to a negative electrode (not shown in the figure) of the electrode body 80 and constitutes an external negative electrode terminal.

The lid 20 is made from a metal material (here, an iron or steel sheet plated with nickel or an aluminum sheet) with a thickness of about 0.5 mm to 1 mm and is a disk-shaped member with a predetermined diameter corresponding to the outer diameter of the case. The central portion of the lid protrudes to the outside (upward in the figure) of the case and constitutes an external positive electrode terminal. Further, as shown in the figure, a ventilation hole 28 is formed in a predetermined location at the side surface of the central protruding portion.

The current cut-off valve 22 constituting a current cut-off mechanism according to the present embodiment is disposed further inside the case 40 with respect to the lid 20. The connecting member 30 according to the present embodiment is disposed further inside the case 40 with respect to the current cut-off valve 22.

These current cut-off valve 22 and connecting member 30 are formed in disk-like shapes of a diameter similar to that of the lid 20. As shown in FIG. 1A, the peripheral edges of the current cut-off valve 22 and connecting member 30 are mutually superimposed and attached to the opening 42 of the case 40, with a gasket (made from a rubber such as EPDM or an insulating resin) 44 being interposed therebetween. More specifically, the connecting member 30, an annular insulating member (insulating packing material) 21 composed of an insulating resin, the current cut-off valve 22, and the lid 20 are stacked in the order of description and caulked and fixed to the opening 42 of the case 40 so that the stacked portion thereof is clamped by the gasket 44.

Such caulking performed by using the gasket 44 produces a sealed battery structure in which the lid (external positive electrode terminal) 20 and the case (external negative electrode terminal) 40 are insulated and the current cut-off valve 22 is closed in the gap therebetween. Further, as shown in the figure, electric conduction (electric connection) between the current cut-off valve 22 and the connecting member 30 in the outer peripheral portion is prevented by inserting the insulating member 21.

Figure 4:
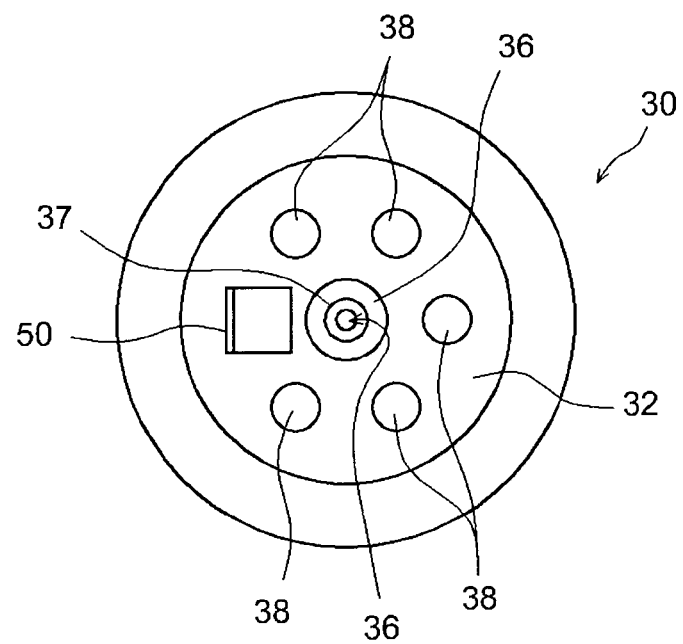
FIG. 4 is a plan view illustrating schematically the structure of the connecting member provided in the battery of one embodiment.

The connecting member 30 will be described below in greater detail. As shown in FIG. 1A, FIG. 1B, and also FIG. 4, which is a plan view taken from the inside (bottom side) of the case 40, the connecting member 30 according to the present embodiment has a thickness of about 0.5 mm to 1 mm and is formed such that a central portion 32 thereof recedes (concaves) on the side facing the electrode body 80 with respect to the outer edge portion relating to the abovementioned caulking, thereby ensuring a predetermined distance (spacing) between the current cut-off valve 22 and the connecting member 30.

It is preferred that an engagement hole 34 according to the present embodiment be formed as a through hole in the central portion (typically, in the central portion of a disk-like shape, as in the present embodiment) of the connecting member 30 made from a metal (or an alloy) constituting the positive electrode, such as aluminum. Further, as shown in FIG. 1B, a thin portion 36, which is thinner than the main body portion of the connecting member on the outer circumference thereof is formed around the engagement hole 34. The appropriate thickness of the thin portion 36 is about 0.1 mm to 0.2 mm, but not limited thereto. Further, as shown in FIG. 1B, an annular slit (notch) 37 is formed along the outer edge of the thin portion 36 in the vicinity of the outer edge thereof on the inner side (side facing the electrode body 80) of the connecting member 30. The slit (notch) preferably has a thickness of about ⅓ to ½ the thickness of the thin portion, and is formed to a depth of, for example, 0.05 mm, but these dimensions are not limiting.

Ventilation holes 38 for gas draining are formed in several locations (a total of five locations in the present embodiment)

on the outside of the thin portion 36 in the central portion of the insulating member 30. A lead member 50 according to the present embodiment, that is, a current collecting member 50 connected to the positive electrode (not shown in the figure) of the electrode body 80 is linked to the inside (side facing the electrode body 80) of the connecting member 30. As a result the electrode body 80 and the connecting member 30 are electrically connected by the lead member 50. The connection (welding) of the lead member 50 and the electrode body 80 may be performed in the same manner as in the conventional cylindrical lithium ion battery and is not a specific feature of the present invention. Therefore, detailed explanation thereof is herein omitted.

The current cut-off valve 22 is explained below. The current cut-off valve 22 according to the present embodiment is disposed, as described above, between the lid 20 and the connecting member 30 and configured to be deformed by an abnormal internal pressure (that is, an abnormal rise in internal pressure caused by gas generation inside the case) inside the case (that is, electrode body accommodating portion). More specifically, the disk-shaped current cut-off valve 22 according to the present embodiment is formed from a thin aluminum sheet with a thickness of about 0.3 mm to 0.5 mm and molded, as shown in FIG. 1A, into a shape such that the central portion thereof is curved from the outer end portion relating to the abovementioned caulking to the connecting member 30 side. The center portion (typically, the central portion as in the present embodiment) is formed to protrude inward the case, and the protruding portion 24 thereof is disposed in a state of fitting into the engagement hole 34 provided in the central portion of the connecting member 30 (that is, fitted state). In this configuration, the protruding portion 24 and the connecting member 30 are linearly (annularly) joined in the contact portion thereof, more specifically, in the peripheral edge of the engagement hole 34 that is in contact with the protruding portion 24 fitted thereinto, by a joining means such as welding (for example, laser welding). Explaining this process in greater detail, as shown in FIG. 1B, the protruding portion 24 is surface joined (annular surface joining along the peripheral edge of the engagement hole 34) to the connecting member 30 at the surface of the protruding portion that is in contact with the inner wall 34A of the engagement hole 34. The connecting member 30 and the current cut-off valve 22 are electrically connected via such joined portion. Such joining establishes sequential electric connection from the positive electrode (not shown in the figure) of the electrode body 80 to the lead member 50, connecting member 30, current cut-off valve 22, and lid (external positive electrode terminal) 20. Furthermore, such joining normally blocks gas circulation between the inside and outside of the case 40 and maintains air tightness of the internal space of the case 40.

Since a linear joined portion (preferably, obtained by surface joining expanding annularly at the inner wall 34A of the engagement hole 34) is formed over a range longer than that of the spot-like joining formed by the conventional spot welding or the like, the battery 10 is formed in which a comparatively large current can flow, without increasing the internal resistance.

Further, an annular slit 26 is formed on the outer periphery of the protruding portion 24 at the surface side (upper surface side in the figure) of the current cut-off valve 22 on the lid 20 side. As a result, when an abnormal internal pressure occurs as described hereinbelow, the current cut-off valve 22 is ruptured in the portion of the slit 26 and the gas located inside the case can be released.

The current cut-off valve 22 of the present embodiment and the operation mode thereof during abnormal rise in the internal pressure on the circumferential portion thereof, that is, the current cut-off mechanism installed in the battery 10 of the present embodiment, will be explained below with reference to the drawings.

Figure 2:
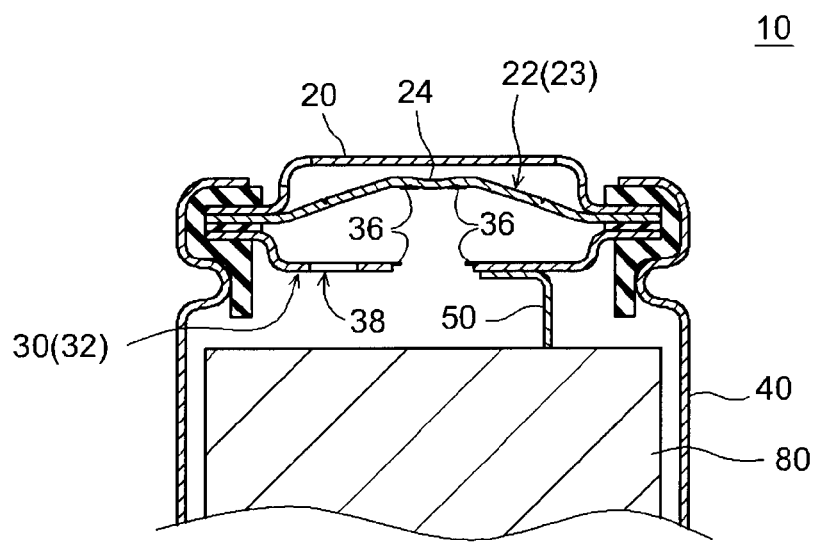
FIG. 2 is a cross-sectional view illustrating the current cut-off mechanism of the battery of one embodiment in a state in which the internal pressure rises.

As shown in FIG. 2, when the internal pressure of the case 40 rises, for whatever reason, above a predetermined level, the central portion 23 that is curved inward of the case (downward in the figure) in the normal state is deformed to be pushed upward (vertical inversion in the present embodiment), and the thin portion 36 of the connecting member 30 is ruptured in the course of this deformation. In the present embodiment, as described above, the slit 37 is formed in part of the thin portion 36. Therefore, the connecting member 30 (thin portion 36) is typically ruptured in the portion of the slit 37, as shown in FIG. 2. In this case, since a strong joint portion is formed between the engagement hole 34 of the connecting member 30 and the protruding portion 24 of the current cut-off valve 22, no separation occurs. Therefore, the engagement hole 34 of the connecting member 30 and the peripheral portion therefor are provided at the current cut-off valve 22 even after the above-mentioned rupture.

As clearly indicated by the structure shown in FIG. 2, the current cut-off valve 22 is separated from the main body of the connecting member 30 due to the rupture at the position of the slit 37, thereby cutting off (that is, disrupting electric connection) the electric current from the connecting member 30 to the current cut-off valve 22 (and in the opposite direction).

Figure 3:
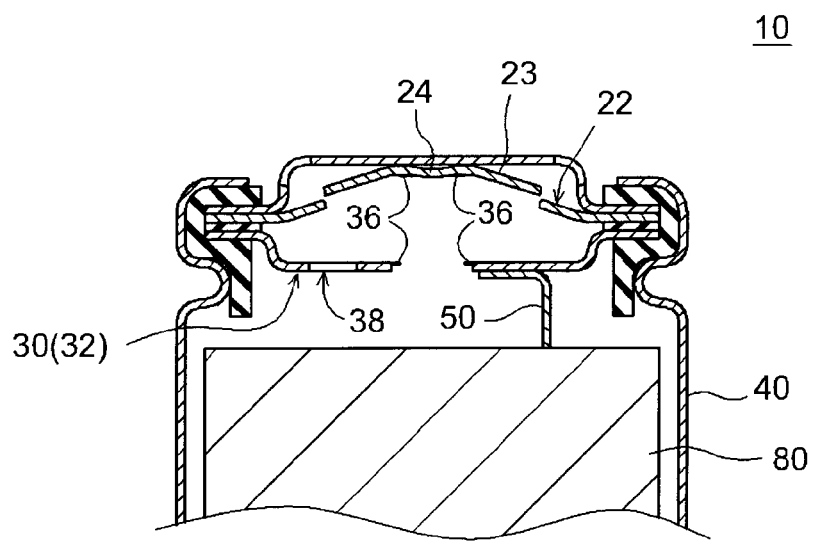
FIG. 3 is a cross-sectional view illustrating a gas release state of the battery according to one embodiment when the internal pressure rises.

Further, when the internal pressure of the case 40 further rises after the electric current has been cut off as described hereinabove, the above-mentioned deformation of the current cut-off valve 22 further advances and then the slit 26 formed on the surface of the current cut-off valve 22 that faces the lid 20 is ruptured as shown in FIG. 3, and the central portion 23 of the current cut-off valve 22 is separated from the outer circumferential portion. As a result, the gas generated inside the case 40 is released from the ventilation hole 38 of the connecting member 30 and from the ruptured zone of the current cut-off valve 22 and released further to the outside through the ventilation hole 28 of the lid 20.

As described hereinabove, with the configuration according to the present embodiment, the protruding portion 24 of the current cut-off valve 22 is fitted in the engagement hole 34 formed in the connecting member 30 and the connecting member 30 and the current cut-off valve 22 are joined linearly (preferably, the connecting member 30 and the current cut-off valve 22 are joined at the surface expanding annularly) in the fitting portion. As a result, it is possible to provide the sealed battery 10 in which a comparatively large current can flow. On the other hand, since the thin portion 36 is formed at the circumferential edge portion of the engagement hole 34 of the connecting member 30 (preferably the slit 37 is formed), when the internal pressure rises abnormally, the current cut-off valve 22 and the main body portion of the connecting member 30 can be reliably separated. When the internal pressure further rises, the current cut-off valve 22 is ruptured, air tightness is disrupted, and the gas generated inside the case can be released to the outside.

Portions of the battery 10 according to the present embodiment that do not relate to the current cut-off mechanism will be described below in a simple manner.

The electrode body 80 according to the present embodiment is a wound electrode body 80 obtained by laminating a sheet-like positive electrode (positive electrode sheet) and a sheet-like negative electrode (negative electrode sheet) together with a total of two sheet-like separators and then winding, while slightly shifting the positive electrode and the negative electrode, similarly to the electrode body of the conventional lithium ion battery.

As a result of conducting the winding with a slight shift in the transverse direction with respect to the winding direction of the wound electrode body 80, end portions of the positive electrode sheet and negative electrode sheet protrude outward from the respective wound core portions (that is, the portions where the positive electrode active material layer formation portion of the positive electrode sheet, negative electrode material layer formation portion of the negative electrode sheet, and separator are tightly wound). On the positive electrode side, one end of the lead member 50 is attached to the protruding portion (non-formation portion of the positive electrode active material layer) and electrically connected to the lid 20 serving as a positive electrode terminal as mentioned hereinabove. On the negative electrode side, the protruding portion (that is, non-formation portion of the negative electrode active material layer) is electrically connected to the case 40 via a negative electrode collector (not shown in the figure).

Materials and parts constituting such wound electrode body 80 are not particularly limited and may be similar to those of the electrode body of the conventional lithium ion battery. For example, the positive electrode sheet can be obtained by applying a positive electrode active material layer for a lithium ion battery to the elongated positive electrode collector. An aluminum foil (present embodiment) or another metal foil suitable for a positive electrode can be advantageously used for the positive electrode collector. One, two or more materials that have been conventionally used in lithium ion batteries can be used without any particular limitation as the positive electrode material. The preferred examples include $LiMn_2O_4$, $LiCoO_2$, and $LiNiO_2$.

The negative electrode sheet can be obtained by applying a negative electrode active material layer for a lithium ion battery to the elongated negative electrode collector. A copper foil (present embodiment) or another metal foil suitable for a positive electrode can be advantageously used for the positive electrode collector. One, two or more materials that have been conventionally used in lithium ion batteries can be used without any particular limitation as the negative electrode material. The preferred examples include carbon-based materials such as graphite carbon and amorphous carbon, lithium-containing transition metal oxides, and transition metal nitrides.

A separator constituted by a porous polyolefin resin is an example of an advantageous sheet-like separator for use between the positive and negative electrode sheets. When a solid electrolyte or gelled electrolyte is used as the electrolyte, the separator is sometimes unnecessary (thus, in this case, the electrolyte itself can function as a separator).

For example, a lithium salt such as $LiPF_6$ can be used as an electrolyte that is accommodated together with the electrode body 80 inside the case 40. A lithium salt such as $LiPF_6$ dissolved in an appropriate amount (for example, concentration 1 M) in a nonaqueous electrolytic solution such as a mixed solvent of diethylene carbonate and ethylene carbonate (for example, a mass ratio of 1:1) can be used as the electrolytic solution.

The electrode body 80 and the electrolytic solution are accommodated in the case 40, and the lid 20, current cut-off valve 22, and connecting member are attached to the case 40, with the gasket 44 and the insulating member 21 being interposed therebetween, and sealed, thereby producing the battery 10 according to the present embodiment.

Since the battery 10 according to the present embodiment can produce a large-current output, such battery can be especially advantageously used as a power source of a motor (electric motor) installed on a vehicle such as an automobile.

The present invention is explained above by considering the advantageous embodiments thereof, but this description is not limiting and it goes without saying that various modifications are possible. For example, in the embodiments, the slits 26, 37 are formed only on one side of the current cut-off valve 22 and the connecting member 30, but the slits may be also formed on both sides of these members.

INDUSTRIAL APPLICABILITY

Figure 5:
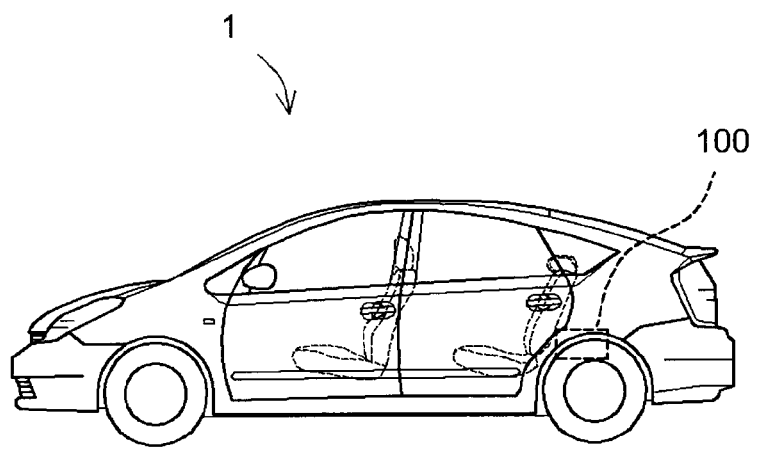
FIG. 5 is a side view showing schematically a vehicle (automobile) equipped with the battery in accordance with the present invention.

The sealed battery in accordance with the present invention can be advantageously used in particular as a power source of a motor (electric motor) installed on a vehicle such as an automobile. Thus, as shown in FIG. 5, a vehicle 1 (typically, an automobile in particular a hybrid automobile, an electric automobile, and an automobile equipped with a motor, such as a fuel cell automobile) can be provided in which the battery 10 disclosed herein is used as a unit cell, the unit cells are disposed in a row in the predetermined direction, and the unit cells are constrained in the arrangement direction to obtain a battery set 100, and the battery set 100 is used a power source.

The invention claimed is:

1. A sealed battery comprising:
an electrode body including a positive electrode and a negative electrode;
a case accommodating the electrode body;
a deformable, disk-shaped current cut-off valve that prevents gas circulation between an inside and an outside of the case and is deformed when an internal pressure in the case rises above a predetermined level;
either a positive external terminal or a negative external terminal electrically connected to the electrode body via the disk-shaped current cut-off valve; and
a connecting member that is electrically connected to the electrode body and has an engagement hole formed in a location adjacent to the disk-shaped current cut-off valve, wherein
the disk-shaped current cut-off valve is conductively connected directly to a peripheral edge and/or an inner wall of the engagement hole of the connecting member by annularly welding in a state in which part of the disk-shaped current cut-off valve is fitted into the engagement hole, and
when the internal pressure in the case rises above the predetermined level, the disk-shaped current cut-off valve is deformed outward of the case by the internal pressure and the disk-shaped current cut-off valve is separated from the connecting member, thereby breaking the electric connection between the connecting member and the disk-shaped current cut-off valve.

2. The sealed battery according to claim 1, wherein the connecting member is ruptured, following the deformation of the disk-shaped current cut-off valve, on an outer periphery of the annularly welded portion, and part of the connecting member including the peripheral edge of the engagement hole of the connecting member is separated together with the disk-shaped current cut-off valve from a main body of the connecting member.

3. The sealed battery according to claim 2, wherein the portion of the connecting member that is separated together with the disk-shaped current cut-off valve is formed thinner than the main body of the connecting member.

4. The sealed battery according to claim 2, wherein a slit that can facilitate the rupture is formed in advance in the portion of the connecting member that is ruptured.

5. The sealed battery according to claim 1, wherein when the internal pressure of the case further rises, part of the disk-shaped current cut-off valve that has separated from the connecting member ruptures and gas release from the inside to the outside of the case is realized.

6. The sealed battery according to claim 5, wherein a slit that can facilitate the rupture is formed in advance in the portion of the disk-shaped current cut-off valve that is ruptured.

7. The sealed battery according to claim 1, which is a cylindrical sealed battery, wherein
the case is formed in a cylindrical shape,
the connecting member and the disk-shaped current cut-off valve are both formed in respective disk shapes and provided at one end in a longitudinal direction of the cylindrical case,
the engagement hole is formed in a central portion of the disk-shaped connecting member, and the peripheral edge portion of the engagement hole is formed thinner than other portions, and
the disk-shaped current cut-off valve is disposed in a state in which a central portion of the disk-shaped current cut-off valve is fitted into the engagement hole in the central portion of the connecting member.

8. The sealed battery according to claim 7, wherein
either the positive external terminal or the negative external terminal that is electrically connected to the disk-shaped current cut-off valve constitutes a lid covering one end in the longitudinal direction of the cylindrical case, and
the external terminal in the form of the lid and the connecting member are mounted on one end in the longitudinal direction of the cylindrical case, while being adjacent to each other.

9. A vehicle comprising the sealed battery according to claim 1.

* * * * *